May 26, 1942.  F. S. THARP  2,284,348
COOLER FOR GLASS FURNACES
Filed June 16, 1939  2 Sheets-Sheet 1
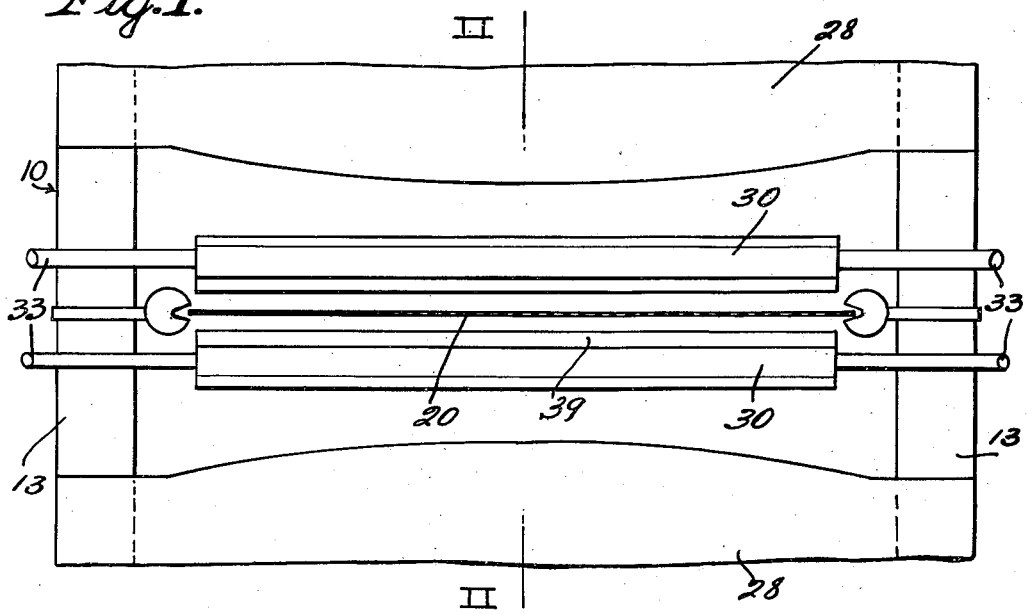
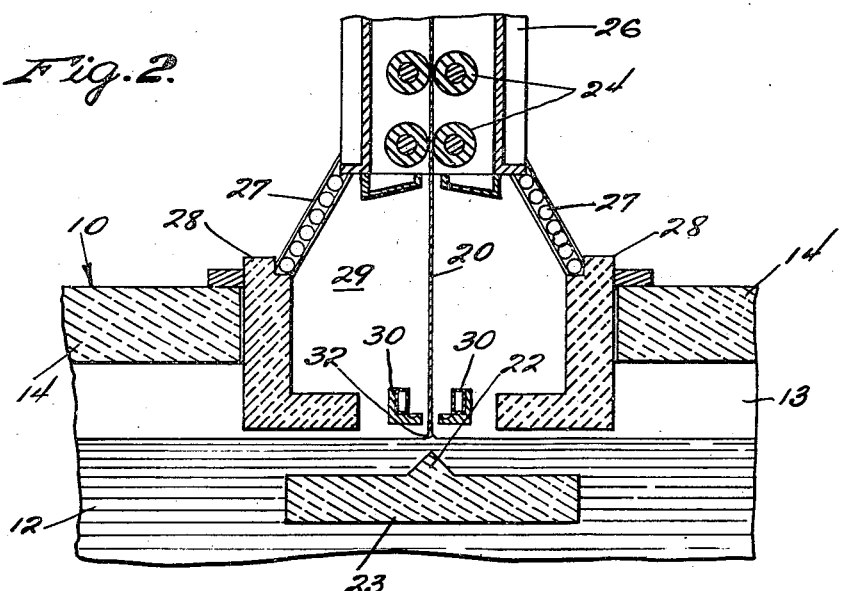
INVENTOR
FOREST S. THARP
BY Olen E. Bee
ATTORNEY

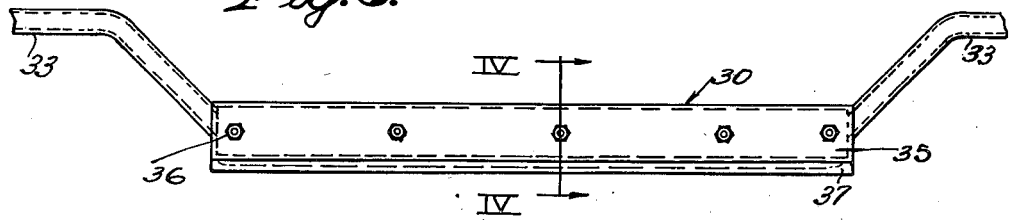
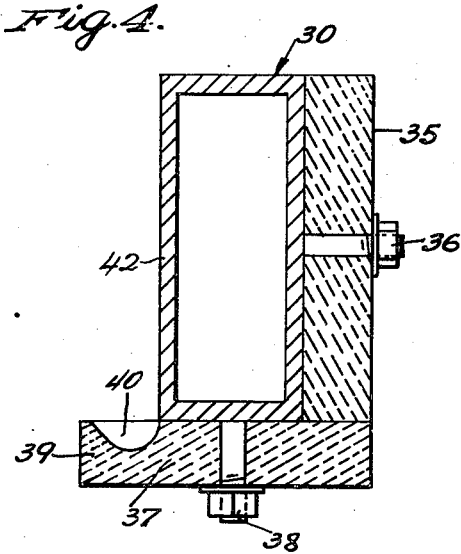
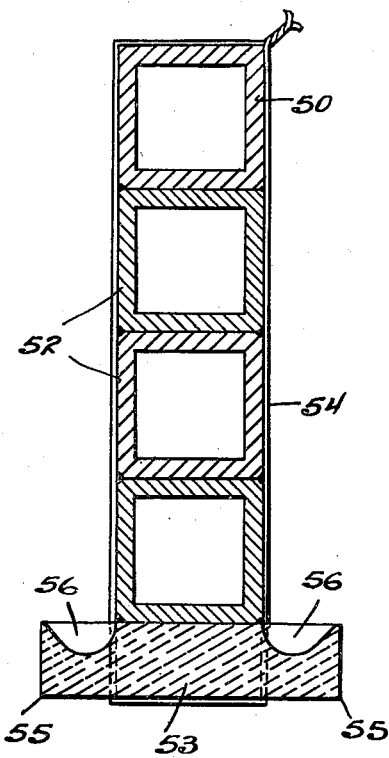
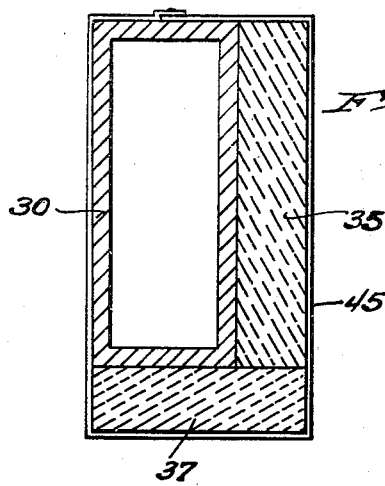

Patented May 26, 1942

2,284,348

UNITED STATES PATENT OFFICE 2,284,348

COOLER FOR GLASS FURNACES

Forest S. Tharp, Clarksburg, W. Va., assignor to Pittsburgh Plate Glass Company, Allegheny County, Pa., a corporation of Pennsylvania Application June 16, 1939, Serial No. 279,397

3 Claims. (Cl. 49—17)

This invention relates to glass drawing apparatus and it has particular relation to a fluid circulating and cooling structure.

One object of the invention is to provide an improved cooler for acting upon a glass sheet as it is being drawn from a molten glass bath.

Another object of the invention is to provide an improved cooler which is so constructed that its heat absorbing characteristics affect the flow of glass from a molten body into a drawn sheet and in such manner as to insure uniformity of sheet thickness and to avoid marring of the sheet.

Another object of the invention is to provide an improved insulated fluid circulating cooler.

In one form of the invention, a transversely arranged cooler is provided on one or more of its sides with insulating material so disposed that uninsulated side portions of the cooler face a drawn glass sheet adjacent its lower extremity or meniscus. The portions of the cooler facing oppositely from the drawn glass sheet or facing the molten glass bath are faced with insulating material, such as suitable refractory. This material can be in the form of sheets or slabs running along one or more sides of the cooler and forming a joint adjacent one corner thereof. Fluid, such as water, air or gas is circulated through the cooler in a conventional manner.

In the drawings:

Figure 1 is a fragmentary plan of a portion of a glass drawing apparatus; Fig. 2 is a fragmentary section taken substantially along the line II—II of Fig. 1, and in which additional sheet drawing structure has been added; Fig. 3 is a side elevation of a cooler employed in connection with the operation of drawing a glass sheet; Fig. 4 is a cross section, on a larger scale, taken substantially along the line IV—IV of Fig. 3; Fig. 5 is a cross section similar to Fig. 4 and illustrating another form of insulated cooler; and Fig. 6 is a cross section of another form of cooler in which a multiple conduit structure is provided.

In practicing the invention, a glass melting furnace 10 is adapted to contain a bath of molten glass 12 and is provided with conventional side walls 13 and roof 14. A glass sheet 20 is drawn upwardly from the molten bath and its plane of drawing is determined by a sheet centering ridge 22 running lengthwise and centrally of a draw bar 23 which is supported in the walls 13 transversely of the furnace.

Suitable rolls 24 engaging opposite sides of the glass sheet are rotatably driven and supported in an upper sheet drawing structure 26 which is carried in a conventional manner above the furnace. Water cooled shields 27 are connected to the drawing structure and to so-called L-blocks 28 to form a drawing chamber 29. Opposite ends of the L-blocks are supported in the walls 13 of the furnaces.

Horizontal coolers 30 in the form of fluid circulating conduits are disposed transversely of the furnace and are supported in the walls 13 thereof in such manner that they lie on opposite sides of the glass sheet 20 adjacent its meniscus 32. These coolers are shown as being rectangular in cross section although the application of the invention is not restricted to this particular shape. Suitable fluid supplying connections 33 are provided at opposite ends of each cooler.

Each cooler 30 includes a facing 35 of insulating material, such as refractory, which can be secured by fastening elements 36. It will be noted that the facing is disposed upon the outer side of each cooler, that is, the side opposite the one which faces the glass sheet 20. The lower side of the cooler is also provided with a facing 37 which is secured in a similar manner by fastening elements 38. If desired, the facings 35 and 37 can be formed as one piece and, as shown in Fig. 4, the lower facing 37 can be extended inwardly to form a lip 39 which is provided on its upper side with a drip collecting groove or trough 40. During the glass drawing operation, as previously practiced with uninsulated coolers, the heat from the molten glass bath and the cooling effect of the fluid passing through the coolers caused sodium oxide or potassium oxide (if potassium were employed in the bath) to form upon the faces of the coolers. The insulated cooler herein described reduces the dripping to a minimum, but whatever dripping that may form drops into the trough 40 and is, therefore, prevented from falling into the glass bath. It will be observed that each cooler has a relatively thin inner wall 42 exposed adjacent the glass sheet as the latter is drawn from the bath and that the lower and outer cooler sides are insulated by the facings 35 and 37 from the upper surface of the bath. Hence, the cooling action is more or less concentrated toward the surface of the sheet directly opposite the cooler and adjacent the meniscus, and the incoming molten glass moving toward the meniscus is not subjected to as much cooling action. These conditions provide for uniformity of flow of the glass into sheet form.

In the form of cooler shown in Fig. 5, the facings 35 and 37 are held in place by means of suitable heat resisting straps 45 and the trough lip 39 is omitted. Otherwise, its construction and operation are substantially the same as those described in connection with Figs. 1 to 4.

In Fig. 6, a cooler 50 is provided with a series of conduits 52 which form a unit and is also provided with a lower insulating facing 53 secured to the conduits 52 by means of straps 54 of wire, or the like. In this arrangement, the outer facing, corresponding to the facing 35, is omitted and the bottom facing 53 is provided with lips 55 projecting in opposite directions from the lower side of the cooler. Longitudinal troughs or grooves 56 are provided in the upper sides of the lips to receive whatever oxide drippings that may fall from either side of the cooler.

Although more than one form of the invention has been shown and described in detail, it will be apparent to those skilled in the art that the invention is not so limited but that various changes can be made therein without departing from the spirit of the invention or from the scope of the appended claims.

I claim:

1. The combination with a glass drawing apparatus having means for defining a vertical plane of drawing to draw a glass sheet vertically from a molten glass bath, and having L-blocks disposed on opposite sides of said plane in spaced relation thereto, a fluid circulating unit disposed horizontally in spaced relation to each L-block between the latter and the plane of drawing as the sheet is drawn from the glass bath, each unit including a cooling conduit having an inner side facing in unshielded relation toward the plane of drawing to cool the glass sheet adjacent its meniscus, said conduit having an outer side facing the L-block and a lower side facing the molten bath surface and refractory shielding material in flat strip form supported along said outer and lower sides of said conduit.

2. In a glass drawing apparatus having means for drawing a glass sheet vertically from a molten glass bath and defining a vertical plane of drawing, a fluid circulating unit disposed horizontally and having end portions supported in the walls of the apparatus, said unit including a conduit which has a bare unobstructed inner side facing the plane of drawing to affect the temperature of the sheet as it is drawn from the glass bath to cool the glass sheet adjacent its meniscus, said conduit also having an outer side facing away from said plane and having a bottom side facing the molten bath and refractory shielding material in strip form supported upon the outer side of the conduit away from the plane of drawing and upon the bottom side of said conduit.

3. In a glass drawing apparatus having means for drawing a glass sheet vertically from a molten glass bath and defining a vertical plane of drawing, a fluid circulating unit including a conduit disposed horizontally and having an inner bare side facing the plane of drawing as the sheet is drawn from the glass bath to cool the glass sheet adjacent its meniscus, said conduit having a lower side facing the molten bath and a refractory shielding plate supported along the lower side of the conduit in opposed relation to the surface of the glass bath and having a troughed lip projecting toward the plane of drawing to catch drippings from the conduit.

FOREST S. THARP.